United States Patent
Ogata et al.

(10) Patent No.: US 8,910,768 B2
(45) Date of Patent: Dec. 16, 2014

(54) CLUTCH CONTROL APPARATUS FOR VEHICLE

(75) Inventors: Makoto Ogata, Isehara (JP); Akira Suwabayashi, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 141 days.

(21) Appl. No.: 13/818,523

(22) PCT Filed: Aug. 30, 2011

(86) PCT No.: PCT/IB2011/001998
§ 371 (c)(1),
(2), (4) Date: Feb. 22, 2013

(87) PCT Pub. No.: WO2012/038791
PCT Pub. Date: Mar. 29, 2012

(65) Prior Publication Data
US 2013/0153359 A1    Jun. 20, 2013

(30) Foreign Application Priority Data
Sep. 21, 2010   (JP) .................................. 2010-210406

(51) Int. Cl.
*F16D 25/04* (2006.01)
*F16D 25/08* (2006.01)
*F16D 48/06* (2006.01)

(52) U.S. Cl.
CPC .............. *F16D 25/04* (2013.01); *F16D 25/087* (2013.01); *F16D 48/066* (2013.01); *F16D 2500/1026* (2013.01); *F16D 2500/501* (2013.01); *F16D 2500/70406* (2013.01)
USPC .................... 192/85.54; 192/85.57; 192/85.63

(58) Field of Classification Search
USPC .......... 192/66.31, 85.53, 85.54, 85.57, 85.08, 192/89.23
See application file for complete search history.

(56) References Cited

U.S. PATENT DOCUMENTS

| | | | |
|---|---|---|---|
| 5,620,076 A * | 4/1997 | Voit et al. .................... | 192/85.54 |
| 6,056,446 A * | 5/2000 | Welter et al. ............... | 192/85.57 |
| 7,267,215 B2 * | 9/2007 | Hans .......................... | 192/85.53 |
| 8,327,991 B2 * | 12/2012 | Scholz et al. .............. | 192/85.54 |
| 2006/0011445 A1 | 1/2006 | Bussit et al. | |
| 2007/0029156 A1 * | 2/2007 | Rogner et al. ........... | 192/85 CA |
| 2009/0192016 A1 | 7/2009 | Petzold et al. | |

FOREIGN PATENT DOCUMENTS

| | | |
|---|---|---|
| DE | 10 2007 034 616 A1 | 2/2008 |
| JP | 07-310762 A | 11/1995 |
| JP | 2004-019744 A | 1/2004 |
| KR | 10-2007-0030559 A | 3/2007 |
| KR | 10-0718342 B1 | 5/2007 |
| WO | 2007/134938 A1 | 11/2007 |

* cited by examiner

*Primary Examiner* — Jacob S Scott
(74) *Attorney, Agent, or Firm* — Young Basile

(57) ABSTRACT

Taught herein is a clutch control apparatus that suppresses oil leakage from a seal member of a hydraulic cylinder even when vibration occurs, without enhancing sealability of the seal member per se. The clutch control apparatus includes normally-closed first clutch, a hydraulic cylinder, a piston, a lip seal and a pressure holding control section. The first clutch is disposed between an engine and driving wheels and is held in engagement by an elastic force applied to the first clutch CL1 by a diaphragm spring. The lip seal is disposed on the piston and enhances sealability between the piston and a housing slide surface in accordance with an increase in hydraulic pressure in the piston chamber. When the first clutch is engaged, the pressure holding control section applies a hydraulic pressure to retain the sealability of the lip seal to the piston chamber while maintaining engagement of the first clutch.

4 Claims, 11 Drawing Sheets

CLUTCH ENGAGEMENT CONDITION

CLUTCH DISENGAGEMENT CONDITION

CLUTCH CONTROL APPARATUS FOR VEHICLE

CROSS-REFERENCE TO RELATED APPLICATIONS

This application claims priority from Japanese Patent Application Serial No. 2010-210406, filed Sep. 21, 2010, which is incorporated herein in its entirety by reference.

TECHNICAL FIELD

The present invention relates to a clutch control apparatus for a vehicle that includes a normally-closed clutch in a drivetrain from a driving power source to driving wheels.

BACKGROUND

Japanese Patent Application Unexamined Publication No. 2004-19744 discloses a clutch apparatus accommodated in a clutch housing in which a piston of a hydraulic cylinder is movable to abut on a release bearing contacted with a diaphragm spring, and thereby allows a clutch disk to be disengaged from a pressure plate.

BRIEF SUMMARY

In the conventional clutch apparatus described above, hydraulic pressure is not applied to the piston under a condition that the piston is pressed back into the hydraulic cylinder by the diaphragm spring of the clutch. Therefore, a tension of a lip seal mounted to the piston (i.e., an outward pressing force of the lip seal) is smaller than that caused in a case where hydraulic pressure is applied to the piston. When vibration is inputted to the piston under the condition that the piston is pressed back, oil leakage is caused due to a lack of the tension of the lip seal.

Specifically, when the rotation speed (or the rotation number) is increased under a condition where the piston is pressed back, that is, under a condition that a hydraulic pressure in a hydraulic cylinder is kept at zero, vibration inputted to the piston becomes larger to thereby cause oil leakage from a seal member of the hydraulic cylinder. Incidentally, in a case where a tension of the lip seal per se, for instance, a rigidity of the lip seal per se, is increased in order to ensure the tension of the lip seal under the condition that the piston is pressed back, the lip seal becomes harder. This thereby increases a resistance to the piston during slide movement of the piston, which results in deterioration in operability of the piston.

In contrast, the present invention provides embodiments of a clutch control apparatus for a vehicle intended to suppress oil leakage from a seal member of a hydraulic cylinder even when vibration is inputted to the piston upon transmitting a driving force, without enhancing a per se sealability of the seal member.

To achieve the these objects, in one aspect of the present invention there is provided a clutch control apparatus for a vehicle that includes a normally-closed clutch, a hydraulic cylinder, a piston, a seal member and a pressure holding controller that controls a hydraulic pressure to be introduced to the seal member upon engagement of the clutch. The normally-closed clutch is disposed between a driving power source and driving wheels and held in engagement by an elastic force of an elastic member which is applied to the clutch.

In one clutch control apparatus according to the present invention, upon engagement of the clutch, the pressure holding controller applies a hydraulic pressure for retaining a sealability of the seal member to the piston chamber of the hydraulic cylinder while maintaining the engagement condition of the clutch. Specifically, upon engagement of the clutch, the hydraulic pressure for retaining a sealability of the seal member is intentionally applied to the piston chamber of the hydraulic cylinder, regardless of that it is of a normally-closed type, so that the tension of the seal member (i.e., a pressing force of the seal member relative to the housing slide surface) becomes larger than that caused where the hydraulic pressure is not applied to the piston chamber. Accordingly, even where a vibration component of a driving force is inputted to the piston of the hydraulic cylinder via the elastic member through the engaged clutch, it is possible to suppress oil leakage from a seal member of the hydraulic cylinder. Further, since the seal member is not enhanced in sealability per se, an increase in sliding resistance of the piston to the housing slide surface can be suppressed upon disengagement of the clutch to thereby ensure a smooth movement of the piston.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

First, the construction of the clutch control apparatus for a vehicle according to embodiments of the present invention will be explained with reference to FIG. 1.

Figure 1:
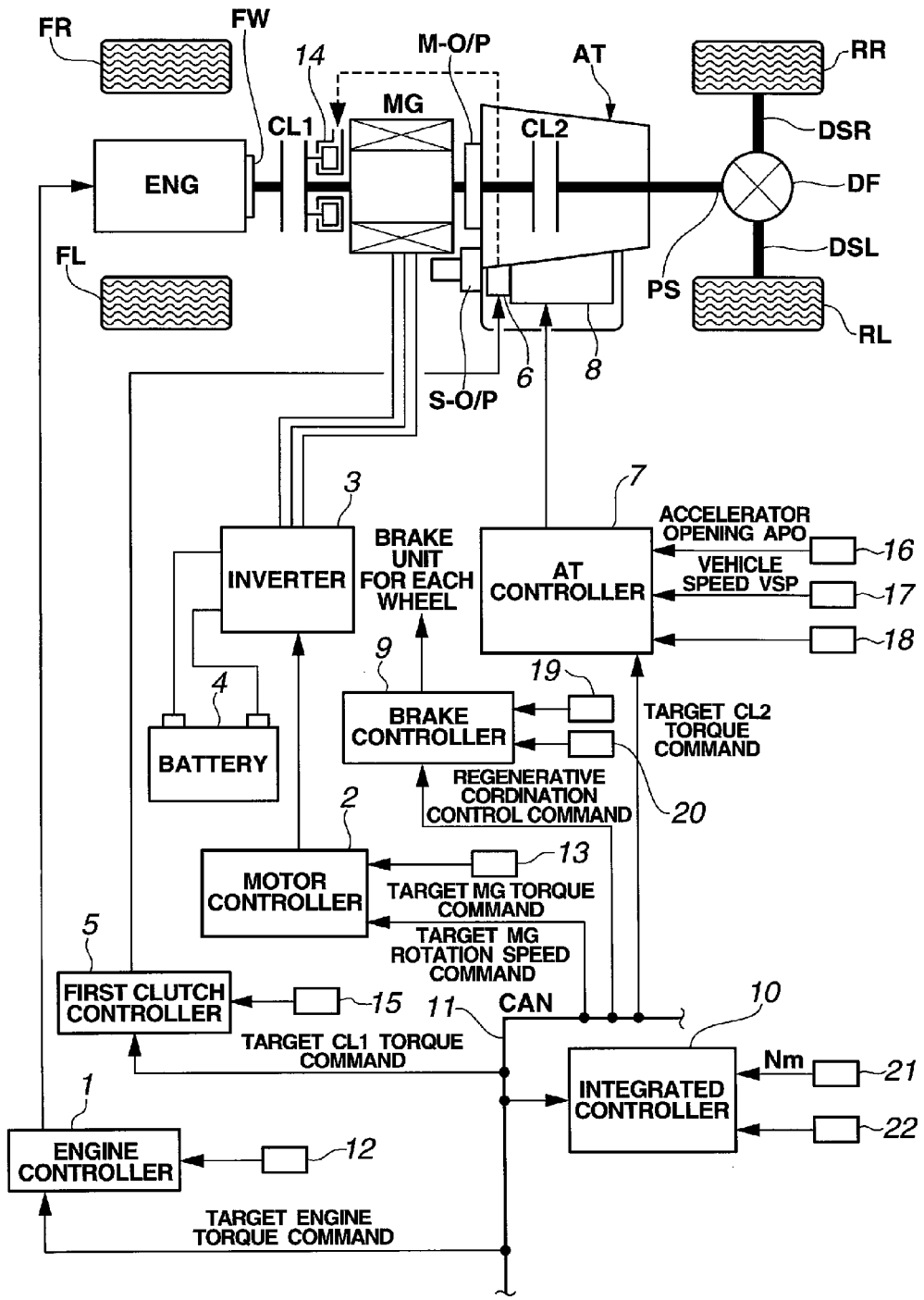
FIG. 1 is a system block diagram showing a rear-wheel-drive FR hybrid vehicle as an example of the vehicle to which a clutch control apparatus according to embodiments of the present invention can be applied.

As shown in FIG. 1, a drivetrain of a FR hybrid vehicle that can incorporate embodiments of the invention includes engine ENG (driving power source), flywheel FW, first clutch CL1 (clutch), motor/generator MG, second clutch CL2, automatic transmission AT, propeller shaft PS, differential DF, left drive shaft DSL, right drive shaft DSR, left rear wheel RL (driving wheel) and right rear wheel RR (driving wheel). Further, FL denotes a left front wheel, FR denotes a right front wheel, M-O/P denotes a main oil pump and S-O/P denotes a sub-oil pump.

Engine ENG may be a gasoline engine or a diesel engine. Engine start control, engine stop control, etc., are carried out on the basis of engine control commands outputted from engine controller 1. Flywheel FW is disposed on an engine output shaft.

First clutch CL1 is disposed between engine ENG and motor/generator MG. First clutch CL1 is a drive mode select clutch that is disengaged upon selecting an electric vehicle drive mode (hereinafter referred to as "EV mode") and engaged upon selecting a hybrid vehicle drive mode (hereinafter referred to as "HEV mode"). A normally-closed dry single disk clutch is used as first clutch CL1.

Motor/generator MG is disposed between first clutch CL1 and automatic transmission AT and has both a function of working as an electric motor and a function of working as a generator. A synchronous motor/generator is used as motor/generator MG, which includes a rotor with a permanent magnet embedded in the rotor and a stator with a stator coil wound around the stator and is controlled by applying a three-phase alternating current thereto.

Second clutch CL2 is disposed between motor/generator MG and left and right rear wheels RL, RR. Second clutch CL2 absorbs torque variation by slip engagement thereof when a transmission torque is varied, for instance, at the time of engine starting. In this example, second clutch CL2 is not provided as a separate clutch, but is constituted of a friction engagement element disposed in a torque transmission path among a plurality of friction engagement elements to be engaged at a speed (or a gear stage) selected in automatic transmission AT.

Automatic transmission AT may be either a stepwise variable transmission that carries out a stepwise changeover between speeds, for instance, seven forward speeds and one reverse speed, or a continuously variable transmission that carries out a continuous changeover in transmission ratio. A transmission output shaft is connected to left and right rear wheels RL, RR through propeller shaft PS, differential DF, left drive shaft DSL and right drive shaft DSR.

Main oil pump M-O/P is disposed on an input shaft of automatic transmission AT and is a mechanically-operated oil pump. Sub-oil pump S-O/P is disposed on a unit housing or the like and is an electric oil pump operated by an electric motor when no discharge oil amount from the main oil pump M-O/P is present, for instance, when the vehicle is stopped in the "EV mode" in which first clutch CL1 is in the disengagement condition, or when the discharge oil amount from main oil pump M-O/P is lacking so that a necessary oil amount is not provided.

Next, a control system of the hybrid vehicle will be explained. As shown in FIG. 1, the control system of the FR hybrid vehicle has engine controller 1, motor controller 2, inverter 3, battery 4, first clutch controller 5, first clutch hydraulic control valve 6, AT controller 7, AT control valve 8, brake controller 9 and integrated controller 10. Engine controller 1, motor controller 2, first clutch controller 5, AT controller 7, and brake controller 9 are connected to integrated controller 10 through CAN communication line 11 that allows information exchange therebetween.

Integrated controller 10 and the other controllers described herein generally consist of a respective microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed herein. The functional (or processing) units of the integrated controller 10 described herein (and the other controllers where appropriate) could be, for example, implemented in software as the executable programs, or could be implemented in whole or in part by separate hardware in the form of one or more integrated circuits (IC). Integrated controller 10 can be an engine control unit (ECU) as known in the art programmed as described herein. Other controllers described herein can be similarly structured. Also, although multiple controllers are shown, fewer or more are possible.

Engine controller 1 receives engine rotation speed (or number) information from engine rotation speed (or number) sensor 12, a target engine torque command from integrated controller 10, and other necessary information. Engine controller 1 outputs a command to control an engine operating point (Ne, Te) to a throttle valve actuator, etc., of engine ENG. That is, engine controller 1 performs engine control.

Motor controller 2 receives a rotor rotational position of motor/generator MG detected by resolver 13, a target MG torque command and a target MG rotation speed (or number) command from integrated controller 10, and other necessary information. Motor controller 2 outputs a command to control a motor operating point (Nm, Tm) of motor/generator MG to inverter 3. That is, motor controller 2 performs motor control. In addition, motor controller 2 monitors battery SOC that indicates a capacity of charge of battery 4.

First clutch controller 5 receives a stroke position of piston 41 of hydraulic cylinder 14 detected by piston stroke sensor 15, a target CL1 torque command from integrated controller 10, and other necessary information. Piston stroke sensor 15 is also called a piston stroke position detecting device. First clutch controller 5 outputs a command to first clutch hydraulic control valve 6 to control engagement, slip-engagement and disengagement of first clutch CL1. That is, first clutch controller 5 performs first clutch control.

AT controller 7 receives information from accelerator opening sensor 16, vehicle speed sensor 17 and other sensors 18 (a transmission input rotation speed sensor, an inhibitor switch, etc.). Further, during the vehicle travel in a selected D range, AT controller 7 searches an optimum speed (i.e., an optimum gear stage) based on a position of the operating point determined in accordance with accelerator opening APO and vehicle speed VSP, using a shift map, and outputs a control command to AT control valve 8 to achieve the optimum speed. That is, AT controller 7 performs shift control. AT controller 7 receives a target CL2 torque command from integrated controller 10 and also outputs a slip engagement control command for second clutch CL2 to AT control valve 8. That is, AT controller 7 performs second clutch control. Finally, AT controller 7 performs a hydraulic shift operation of automatic transmission AT and also performs line pressure PL control in order to prepare for a hydraulic pressure discharge operation of first clutch CL1.

Brake controller 9 receives the respective wheel speed of four wheels detected by wheel speed sensor 19, sensor information from brake stroke sensor 20, a regenerative coordination control command from integrated controller 10, and other necessary information. Where upon a brake operation, the braking force is lacking and fails to attain a required braking force determined according to brake stroke BS of the brake pedal depression when applying only a regenerative braking force, brake controller 9 compensates the shortage of the braking force by a mechanical braking force. That is, brake controller 9 performs regenerative coordination brake control.

Integrated controller 10 controls consumption energy of the vehicle as a whole and performs operations to efficiently travel the hybrid vehicle. Integrated controller 10 receives information from motor rotation speed (or number) sensor 21 that detects motor rotation speed (or number) Nm, necessary information from other sensors/switches 22, and other information through CAN communication line 11. Integrated controller 10 outputs the target engine torque command to engine controller 1, the target MG torque command and the target MG rotation speed command to motor controller 2, the target CL1 torque command to first clutch controller 5, the target CL2 torque command to AT controller 7, and the regenerative coordination control command to brake controller 9, respectively. In this way, integrated controller 10 performs integrated control.

Figure 2:
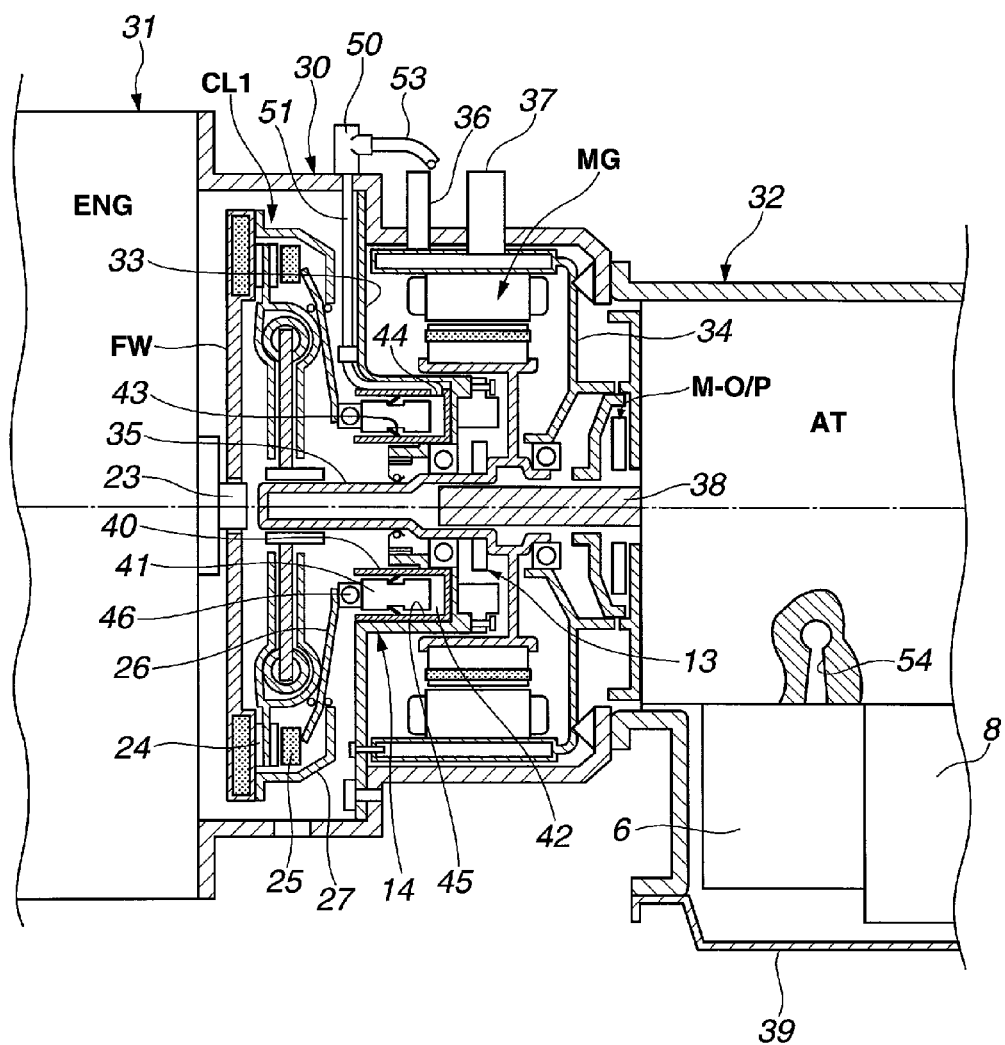
FIG. 2 is a cross section showing a clutch-and-motor unit including an example of a first clutch that is controlled between engagement and disengagement by the clutch control apparatus according to a first embodiment.

Next, referring to FIG. 2, the construction of a clutch-and-motor unit according to an embodiment will be explained. The clutch-and-motor unit includes unit housing 30, and first clutch CL1, hydraulic cylinder 14, motor/generator MG and main oil pump M-O/P accommodated in unit housing 30.

Unit housing 30 has a front side portion connected to engine block 31 of engine ENG and a rear side portion connected to transmission case 32 of automatic transmission AT.

First clutch CL1 is arranged in a first chamber (a dry chamber) surrounded and defined by engine ENG and motor cover 33. First clutch CL1 includes flywheel FW, clutch disk 24, pressure plate 25, diaphragm spring 26 (also called an elastic member) and spring fulcrum plate 27. Flywheel FW is connected to crankshaft 23 of engine ENG. Clutch disk 24 is spline-coupled to hollow motor shaft 35 of motor/generator MG. Pressure plate 25 is arranged such that clutch disk 24 is sandwiched between pressure plate 25 and flywheel FW. Diaphragm spring 26 has one end abutting against pressure plate 25, thereby holding engagement of first clutch CL1 by an elastic force (also called a spring force or a biasing force) of diaphragm spring 26. Spring fulcrum plate 27 is disposed to set a spring fulcrum in a midpoint position of diaphragm spring 26.

Hydraulic cylinder 14 has a CSC (Concentric Slave Cylinder) construction. Hydraulic cylinder 14 is disposed in an end portion of diaphragm spring 26 within the first chamber and serves as a hydraulic actuator for first clutch CL1. Hydraulic cylinder 14 includes piston housing 40, piston 41, piston chamber 42, lip seal (or seal member) 43 having a V-shaped cross section, oil supply/discharge opening 44, housing slide surface 45 and release bearing 46. Piston 41 is disposed in piston housing 40 so as to be slidable relative to piston housing 40. Piston 41 has one end to which the elastic force of diaphragm spring 26 is applied through release bearing 46 and another end to which the hydraulic pressure in piston chamber 42 is applied. Lip seal 43 is mounted into a seal groove formed on an outer circumferential surface of piston 41. Lip seal 43 has a V-shape in cross section that is opened toward the side of piston chamber 42 such that the sealability relative to housing slide surface 45 is enhanced due to an increase in hydraulic pressure in piston chamber 42.

Motor/generator MG is disposed in a second chamber (a dry chamber) surrounded and defined by motor cover 33 and stator housing 34. Resolver 13 is disposed on an inside of the rotor of motor/generator MG. High-voltage harness terminal 36 and cooling water inlet/outlet port 37 extend through unit housing 30.

Main oil pump M-O/P is disposed in a third chamber (a wet chamber) surrounded and defined by stator housing 34 and automatic transmission AT. Main oil pump M-O/P is driven by transmission input shaft 38 connected to hollow motor shaft 35.

Figure 3:
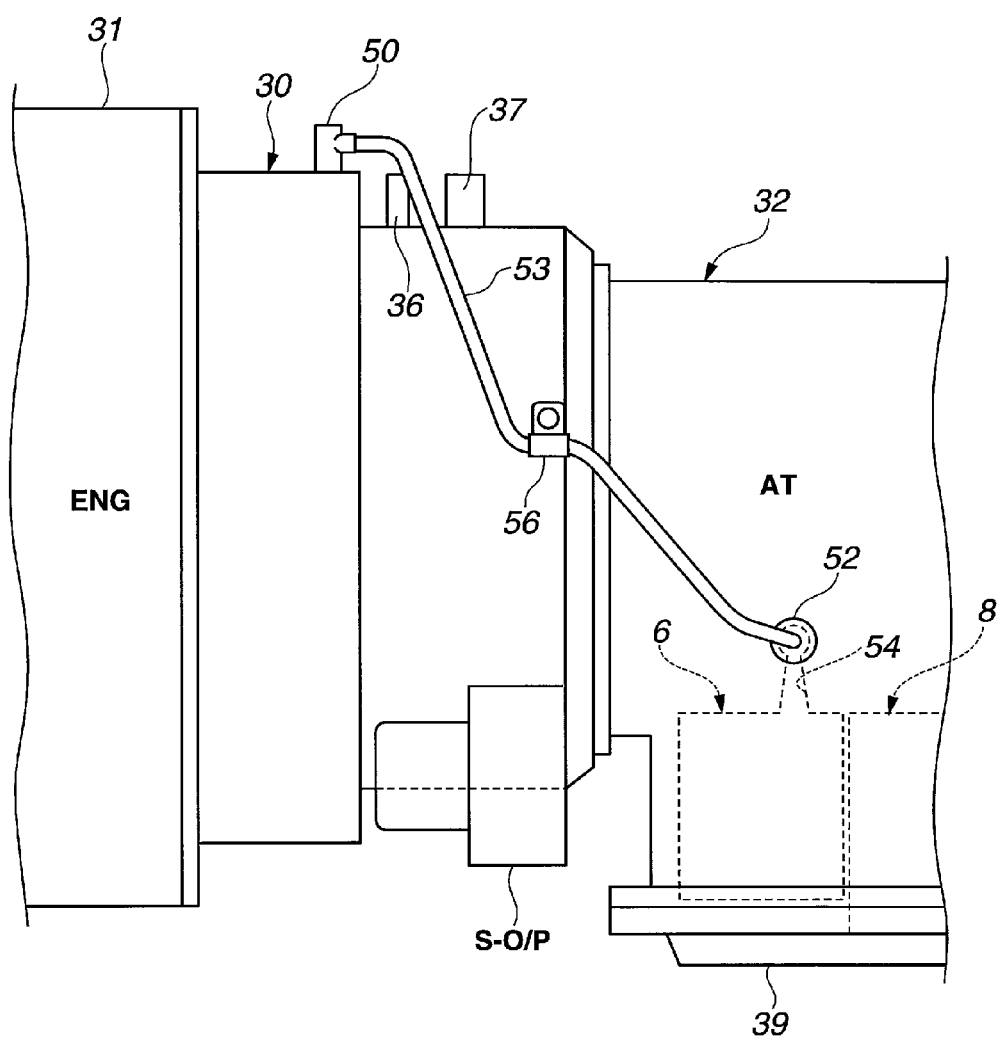
FIG. 3 is an side view showing an external pipe that connects a hydraulic cylinder to a first clutch hydraulic control valve to control engagement and disengagement of the first clutch according to the first embodiment.

Next referring to FIGS. 2 and 3, the construction of a first clutch hydraulic passage according to a first embodiment of the invention will be explained. The first clutch hydraulic passage connects piston chamber 42 of hydraulic cylinder 14 with first clutch hydraulic control valve 6. The hydraulic passage is constituted of inner pipe 51 extending from oil supply/discharge opening 44 to pipe connector 50, outer pipe 53 extending from pipe connector 50 to case mount portion 52 and in-case hydraulic passage 54 that is formed in transmission case 32 in communication with outer pipe 53. Further, an intermediate portion of outer pipe 53 is supported in the longitudinal direction on unit housing 30 by clip 56.

Figure 4:
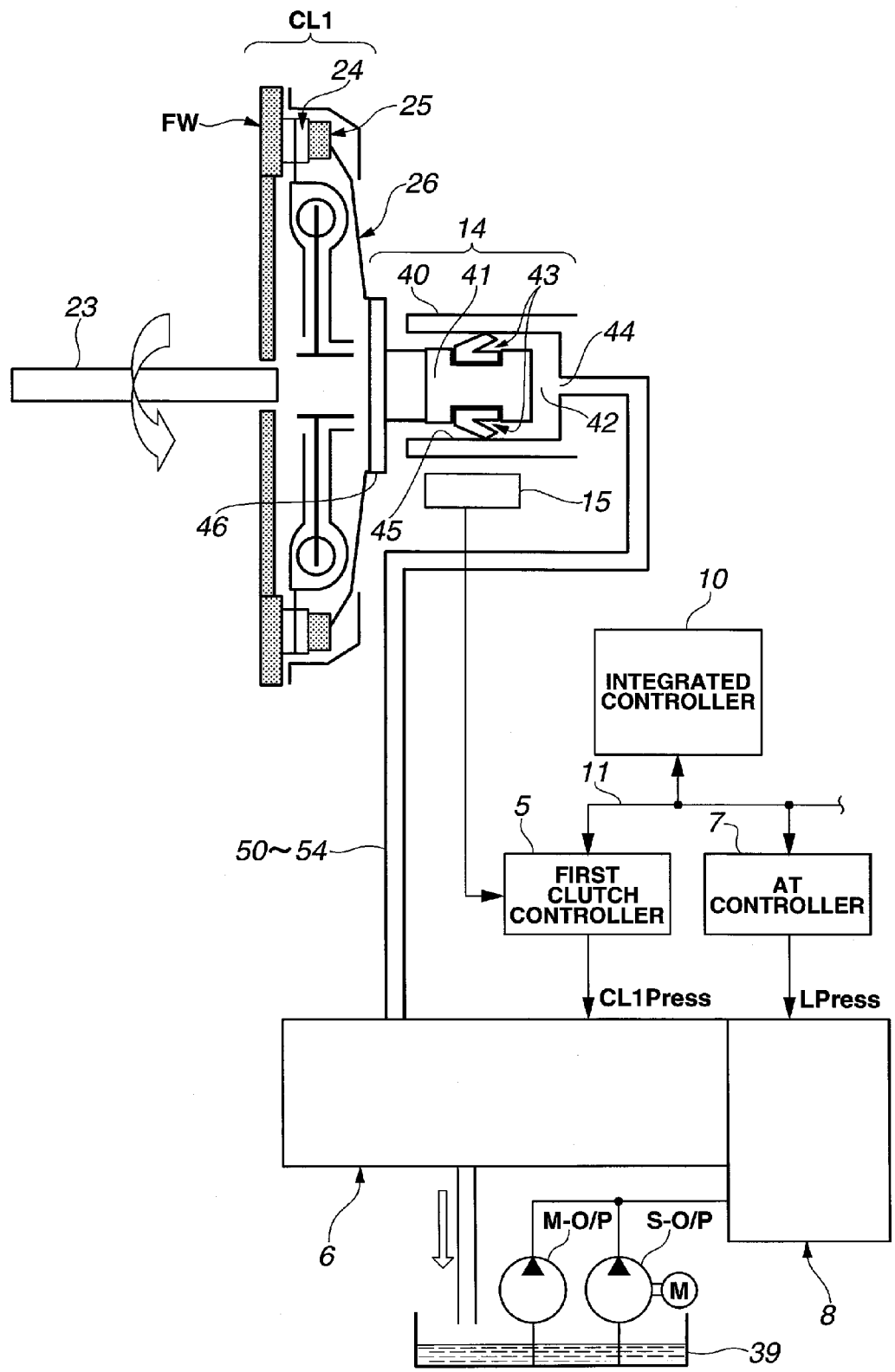
FIG. 4 is a block diagram showing a hydraulic control system and an electronic control system that control engagement and disengagement of the first clutch according to the first embodiment.

Next, referring to FIG. 4, the construction of an electronic control system and a hydraulic control system of first clutch CL1 according to the first embodiment will be explained. The electronic control system of first clutch CL1 includes first clutch controller 5, AT controller 7 and integrated controller 10. The hydraulic control system of first clutch CL1 includes main oil pump M-O/P, sub-oil pump S-O/P, AT control valve 8, first clutch hydraulic control valve 6, pipes 50-54 and hydraulic cylinder 14.

AT control valve 8 is a valve that produces a line pressure in accordance with line pressure command value LPress outputted from AT controller 7 by using pump discharge oil as a source pressure. The pump discharge oil is pumped from oil pan 39 by main oil pump M-O/P or sub-oil pump S-O/P. Under this line pressure control, for instance, line pressure command value LPress is outputted, which corresponds to a select-high value of one of a clutch disengagement pressure value needed for disengagement of first clutch CL1, a necessary pressure value for retention of transmission input torque and a minimum line pressure value.

First clutch hydraulic control valve 6 is a valve that uses the line pressure as a source pressure and controls a piston pressure to be supplied to piston chamber 42 of hydraulic cylinder 14 to be a piston pressure command value CL1 Press outputted from first clutch controller 5. First clutch controller 5 receives a stroke position of piston 41 of hydraulic cylinder 14 from piston stroke sensor 15 and performs first clutch hydraulic control by using the piston stroke position information to recognize an engagement/disengagement condition of first clutch CL1. Under the first clutch hydraulic control, first clutch controller 5 performs drain control to drain the piston pressure upon engagement of first clutch CL1 in a low rotation speed range and performs pressure holding control to retain sealability of lip seal 43 while maintaining the clutch engagement condition upon engagement of first clutch CL1 in a high rotation speed range. Further, upon slip-engagement and full disengagement of first clutch CL1, first clutch controller 5 performs torque capacity control to maintain the slip-engagement condition and the full disengagement condition of first clutch CL1.

Figure 5:
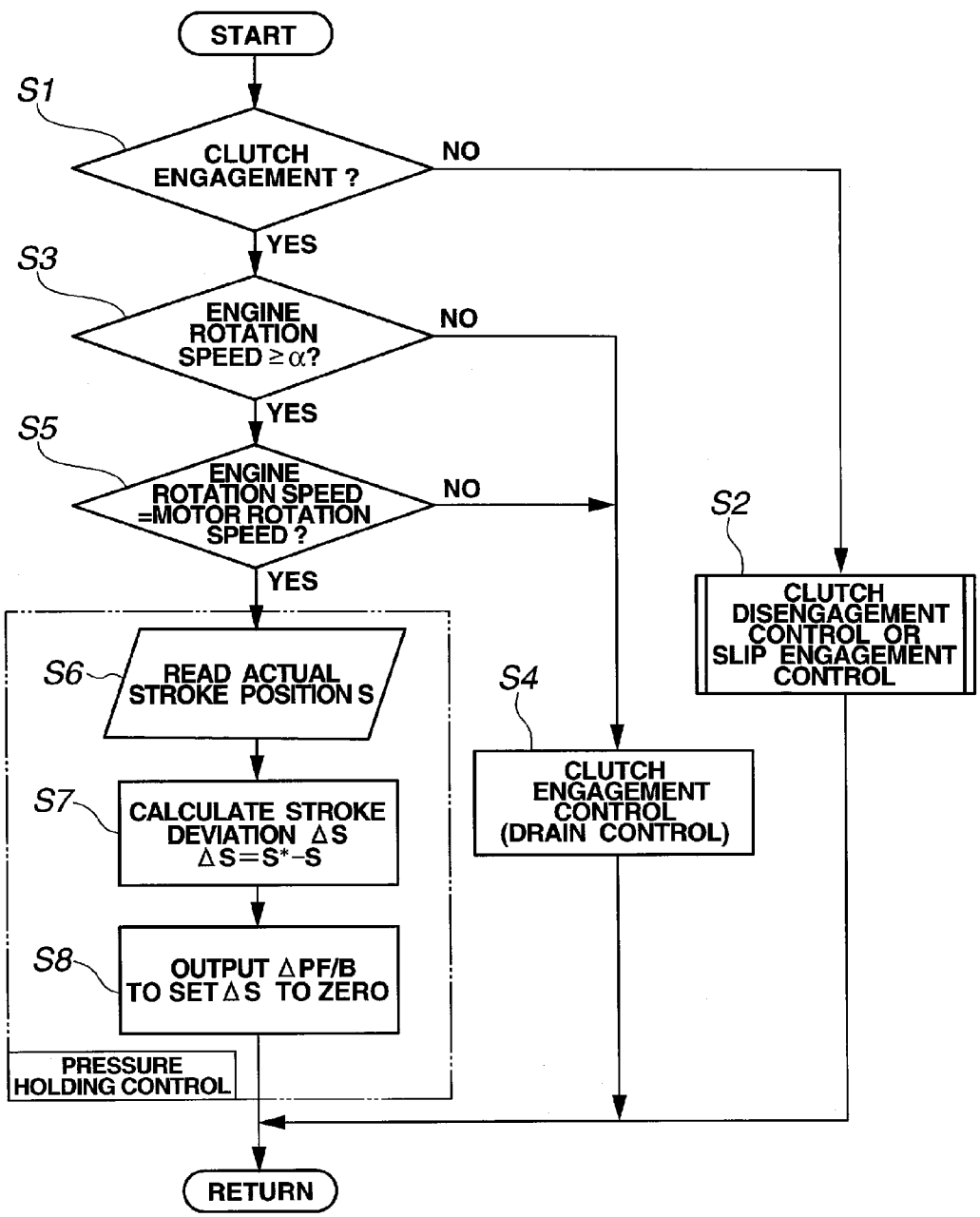
FIG. 5 is a flowchart showing a flow of the first clutch control operation executed by an integrated controller according to the first embodiment.

FIG. 5 is a flowchart showing a flow of the first clutch control operation executed by integrated controller 10 according to the first embodiment.

In step S1, a judgment is made as to whether or not a control command to first clutch CL1 is a clutch engagement command. When the answer in step S1 is YES, the routine proceeds to step S3. When the answer in step S1 is NO (e.g., the control command is a clutch disengagement command or a slip-engagement command), the routine proceeds to step S2, where clutch disengagement control to allow first clutch CL1 to be in a disengagement condition or slip-engagement control to allow first clutch CL1 to be in a slip-engagement condition is executed. Then, the routine proceeds to RETURN.

Figure 8:
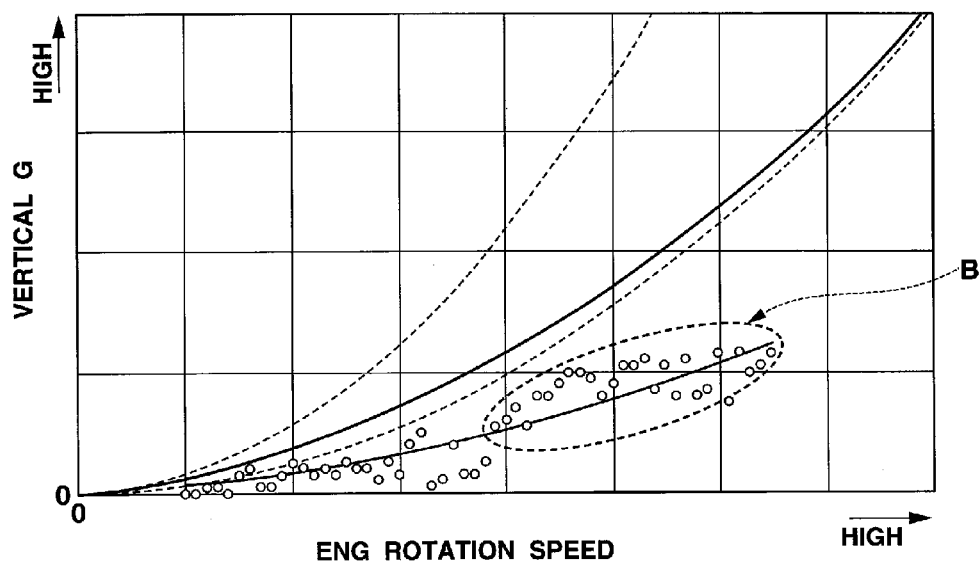
FIG. 8 is a diagram showing a relationship of vertical force (vibration) and engine rotation speed in the comparative embodiment.

In contrast, when the control command is the clutch engagement command to first clutch CL1 in step S1, a judgment is made as to whether or not engine rotation speed is not less than predetermined threshold value a in step S3. When the engine rotation speed<α (YES in step S3), the routine proceeds to step S5. When the engine rotation speed≥α (NO in step S3), the routine proceeds to step S4. Predetermined threshold value α is set to an engine rotation speed value at which there occurs oil leakage from the lip seal 43, for instance 3500 rpm, on the basis of the relationship between engine rotation speed and vibration as indicated by experimental data. In this example, the characteristic diagram shown in FIG. 8 is used to set predetermined threshold value α.

After a judgment that engine rotation speed<α in step S3, clutch engagement control is executed by carrying out drain control to drain a hydraulic pressure in piston chamber 42. Then, the routine proceeds to RETURN.

On the other hand, if engine rotation speed≥α in step S3, a judgment is made as to whether or not engine rotation speed Ne is equal to motor rotation speed Nm in step S5. When engine rotation speed Ne=motor rotation speed Nm (YES in step S5), the routine proceeds to step S6. When engine rotation speed Ne≠motor rotation speed Nm (NO in step S5), the routine proceeds to step S4 as previously discussed. Accordingly, step S5 is a query as to whether or not first clutch CL1 has reached an engagement condition without any slip.

Once first clutch CL1 is engaged without slip (engine rotation speed Ne=motor rotation speed Nm in step S5), actual stroke position S detected by piston stroke sensor 15 is read in step S6. In next step S7, a stroke deviation ΔS that is a difference between a target stroke position S* and actual stroke position S is calculated. Target stroke position S* is set to the piston stroke position in a rotation-stop engagement condition of first clutch CL1. That is, target stroke position S* is set to the piston stroke position before piston 41 is pressed back by diaphragm spring 26. Then, the routine proceeds to step S8.

In step S8, a feedback control hydraulic pressure ΔPF/B to set stroke deviation ΔS to zero, that is, feedback control hydraulic pressure ΔPF/B to conform actual stroke position S to target stroke position S* is calculated, and a control command to obtain feedback control hydraulic pressure ΔPF/B is outputted. Then, the routine proceeds to RETURN. Broadly, steps S6 to S8 correspond to a pressure holding control section.

Next, an operation of the clutch control apparatus according to the first embodiment will be explained. First, a problem resulting from clutch engagement control in a comparative embodiment is explained. Then, the operation of the clutch control apparatus employed in the FR hybrid vehicle according to the first embodiment is explained by separately explaining engagement/disengagement control and pressure holding control for first clutch CL1.

It is assumed that the comparative embodiment maintains the engagement condition of first clutch CL1 by drain control regardless of high rotation speed or low rotation speed of first clutch CL1.

Figure 6A:
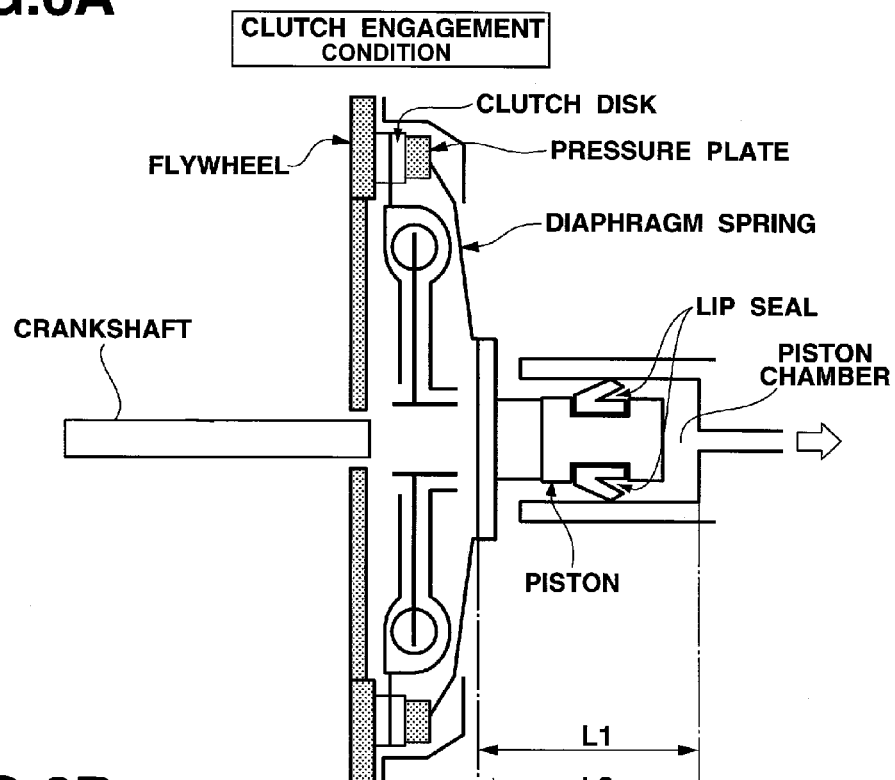
FIG. 6A is a diagram showing an engagement condition of a first clutch when the clutch rotation is stopped in a comparative embodiment.

FIG. 6A shows the engagement condition of first clutch CL1 when clutch rotation is stopped in the comparative embodiment. When the clutch rotation is stopped, the diaphragm spring is free from being outwardly expanded due to the centrifugal force generated by the clutch rotation. Therefore, the piston of the hydraulic cylinder that supports the diaphragm spring is located in the position where the clutch transmission capacity can be ensured. That is, an axial length of the hydraulic cylinder that extends from a distal end surface of the release bearing to a bottom surface of the piston chamber is kept at L1.

Figure 6B:
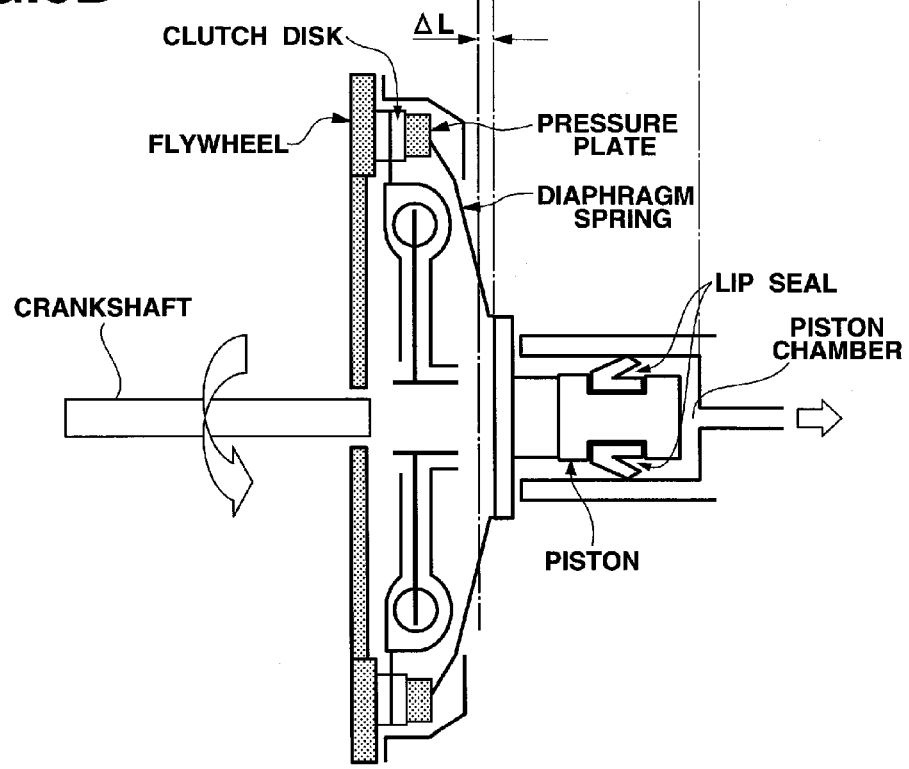
FIG. 6B is a diagram showing an engagement condition of the first clutch in the comparative embodiment when the clutch rotation speed is high.

In contrast, FIG. 6B shows the engagement condition of first clutch CL1 when the clutch rotation speed is high in the comparative embodiment. When the clutch rotation speed is high, the diaphragm spring is outwardly expanded due to the centrifugal force generated by the clutch rotation. Therefore, the piston of the hydraulic cylinder is pressed back toward the bottom surface of the piston chamber by the diaphragm spring and moved to a press-back position. That is, the axial length of the hydraulic cylinder that extends from the distal end surface of the release bearing to the bottom surface of the piston chamber is reduced to L2, which is smaller than L1. Thus, there is generated a difference between axial length L1 and axial length L2 by press-back stroke amount ΔL.

Figure 7:
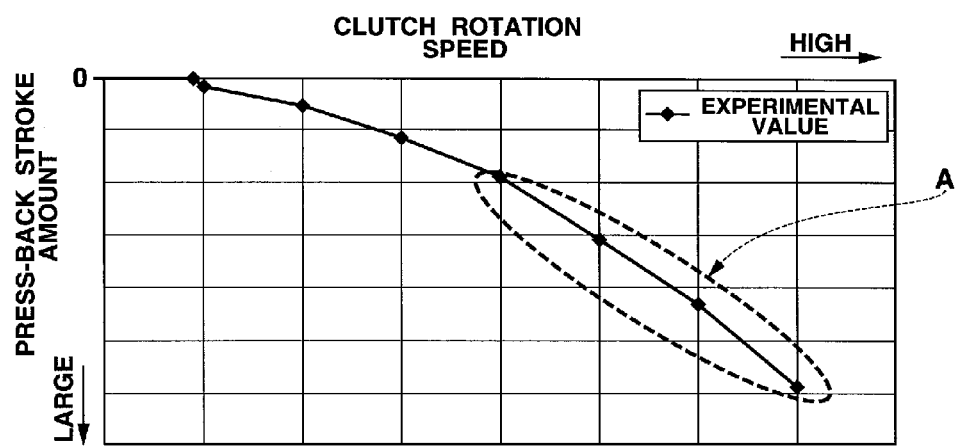
FIG. 7 is a characteristic diagram showing the relationship of a piston press-back stroke amount to the clutch rotation speed in the comparative embodiment.

FIG. 7 shows a relationship of a press-back stroke amount of the piston to a clutch rotation speed in the comparative embodiment. As seen from FIG. 7, as the clutch rotation speed becomes higher, the press-back stroke amount is increased. In particular, in a high rotation speed range of first clutch CL1, a large press-back stroke amount is generated as indicated in circled portion A.

Figure 9:
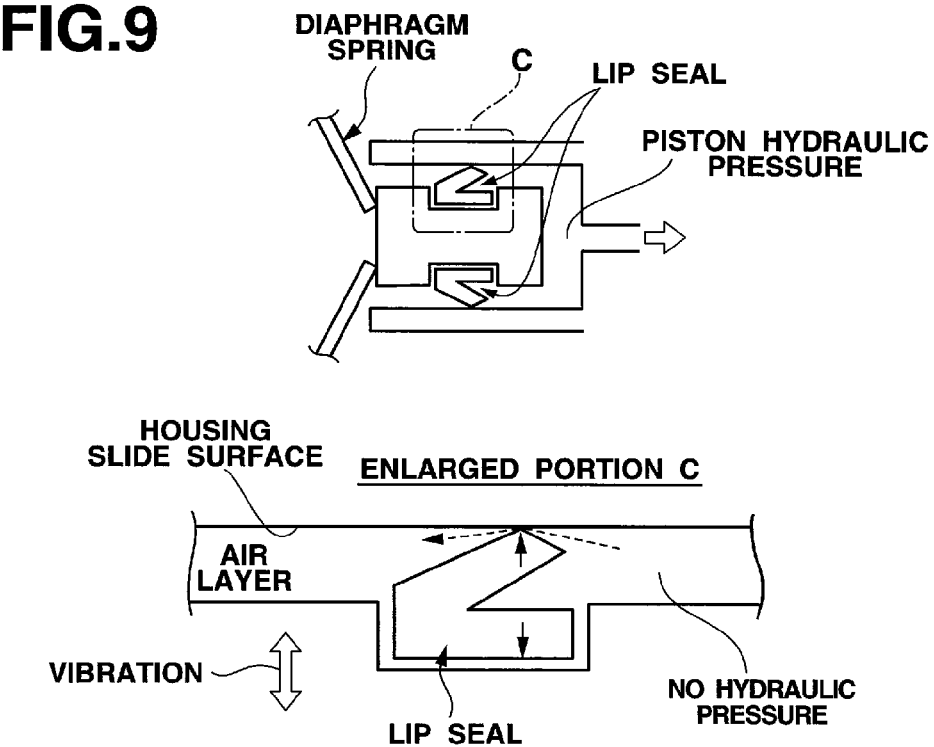
FIG. 9 is a showing the occurrence of oil leakage from a seal portion of a hydraulic cylinder in a comparative embodiment.

However, in the comparative embodiment, under a condition that the piston is pressed back by the diaphragm spring of first clutch CL1 as shown in FIG. 6B, the hydraulic pressure is not applied to the piston chamber. Therefore, a tension of the lip seal (i.e., an outward pressing force of the lip seal) is obtained by only an elastic restoring force of the lip seal per se, so that the tension of the lip seal becomes small as shown in FIG. 9. In a case where vibration is inputted to the piston when pressed back, a clearance between the lip seal and the housing slide surface is generated due to lack of the tension of the lip seal. As a result, the oil in the piston chamber tends to leak into an air layer through the clearance.

FIG. 8 shows a relationship of vertical G (i.e., vibration) to engine rotation speed in the comparative embodiment, that is, in an embodiment not incorporating the control herein. As seen from FIG. 8, as the engine rotation speed is increased, the vibration level becomes higher. In particular, in a high rotation speed range of the engine, the vibration level becomes extremely high as indicated in circled portion B. Where the vibration with this high a level is inputted to the piston through the diaphragm spring, a risk of oil leakage is enhanced.

To solve this problem, one solution is to enhance the tension of the lip seal per se in order to ensure a sufficient tension of the lip seal when the piston is pressed back. However, this solution results in an increased hardness of the lip seal, thereby, for instance, enhancing a resistance of the piston during the sliding movement upon disengagement of first clutch CL1. This leads to deterioration in operability of the piston.

Figure 12:
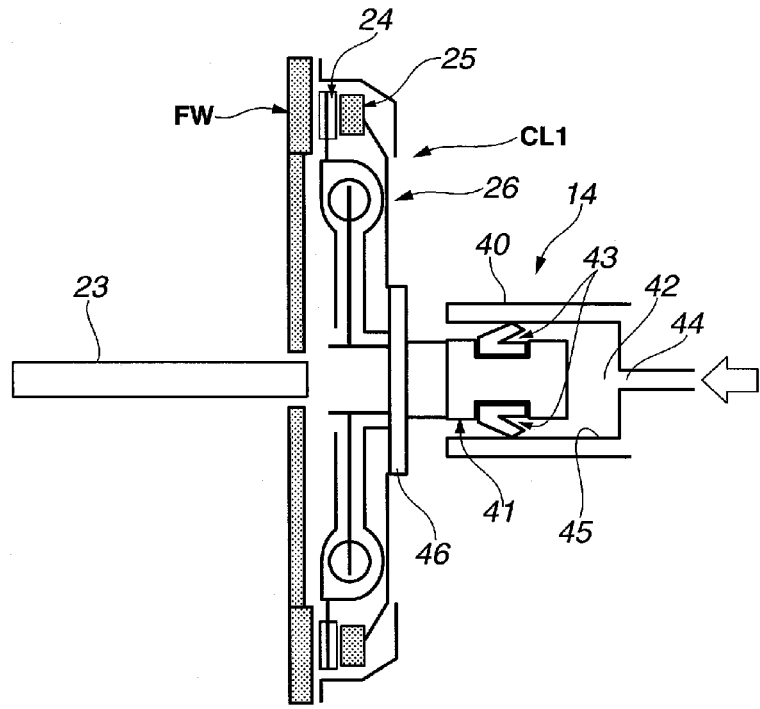
FIG. 12 is a diagram showing disengagement control in the first embodiment in which a piston of the hydraulic cylinder is pressed toward the first clutch.

An engagement/disengagement control operation for first clutch CL1 according to the first embodiment is now explained. Upon disengagement of first clutch CL1, step S1, step S2 and RETURN of FIG. 5 are repeatedly executed to perform clutch disengagement control. In the clutch disengagement control, a hydraulic pressure (for instance, 0.5 Mpa) is applied to piston chamber 42 of hydraulic cylinder 14. Owing to the application of the hydraulic pressure, as shown in FIG. 12, piston 41 is moved toward a front side of the vehicle and presses a radial-inner end portion of diaphragm spring 26 to thereby move a radial-outer end portion of diaphragm spring 26 apart from pressure plate 25 via the spring fulcrum. By this clutch disengagement operation, pressure plate 25 is separated from clutch disk 24 so that transmission of the driving force from engine ENG is interrupted.

Upon slip-engagement of first clutch CL1, step S1, step S2 and RETURN of FIG. 5 are repeatedly executed to perform clutch slip-engagement control. In the clutch slip-engagement control, a feedback hydraulic pressure is applied to piston chamber 42 of hydraulic cylinder 14 so as to hold piston 41 of hydraulic cylinder 14 in a stroke position where the slip-engagement condition of first clutch CL1 is established.

When first clutch CL1 is in engagement and the engine rotation speed is less than threshold value α, step S1, step S3, step S4 and RETURN of FIG. 5 are repeatedly executed to perform clutch engagement control by carrying out drain control. In this clutch engagement control, for instance, as shown in FIG. 6A, the engagement condition of first clutch CL1 is maintained by the elastic force of diaphragm spring 26 by draining the hydraulic pressure in piston chamber 42 of hydraulic cylinder 14.

When first clutch CL1 is in engagement, the engine rotation speed is not less than threshold value α, and the clutch engagement condition is maintained, step S1, step S3, step S5, step S6, step S7, step S8 and RETURN of FIG. 5 are repeatedly executed to perform clutch engagement control by carrying out pressure holding control. That is, in step S7, the piston stroke position in the rotation-stop engagement condition of first clutch CL1 is determined as target stroke position S*, and stroke deviation ΔS that is a difference between target stroke position S* and actual stroke position S is calculated. In step S8, feedback control hydraulic pressure ΔPF/B to conform actual stroke position S to target stroke position S* is calculated, and a control command to obtain feedback control hydraulic pressure ΔPF/B is outputted.

As explained above, a feature of the control in the first embodiment is that the pressure holding control of steps S6, S7 and S8 is adopted in a high rotation speed range of engine ENG under engagement control for first clutch CL1. In the following, the pressure holding control operation for first clutch CL1 will be explained in additional detail.

When first clutch CL1 is in engagement in the high rotation speed range of engine ENG, the pressure holding control is performed by applying a hydraulic pressure (for instance, 0.02-0.08 Mpa) to retain the sealability of lip seal 43 to piston chamber 42 of hydraulic cylinder 14, while maintaining the engagement condition of first clutch CL1.

Figure 10:
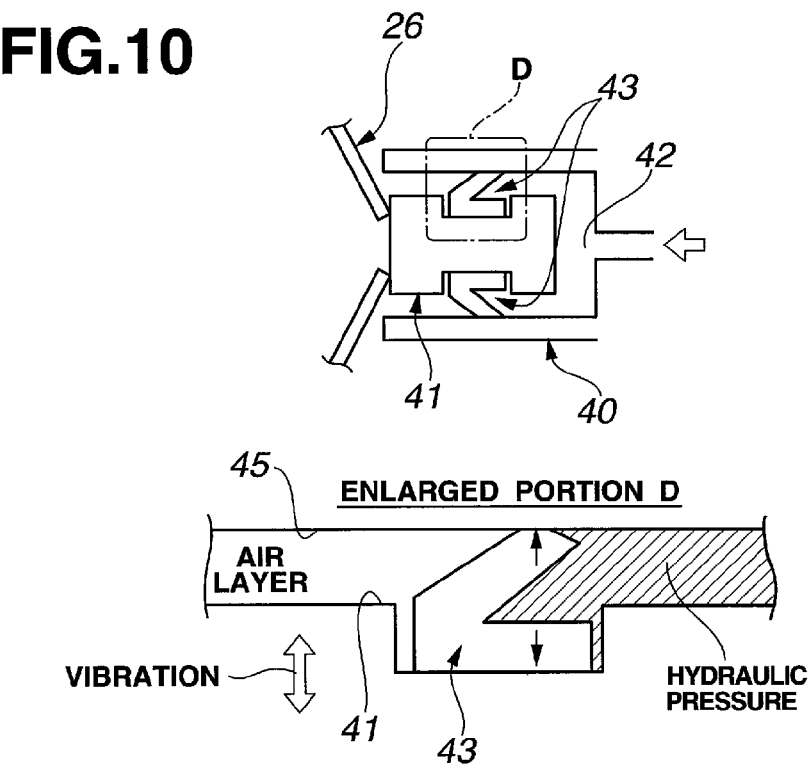
FIG. 10 is a diagram showing the prevention of oil leakage from a seal portion of a hydraulic cylinder in the first embodiment.
Figure 11:
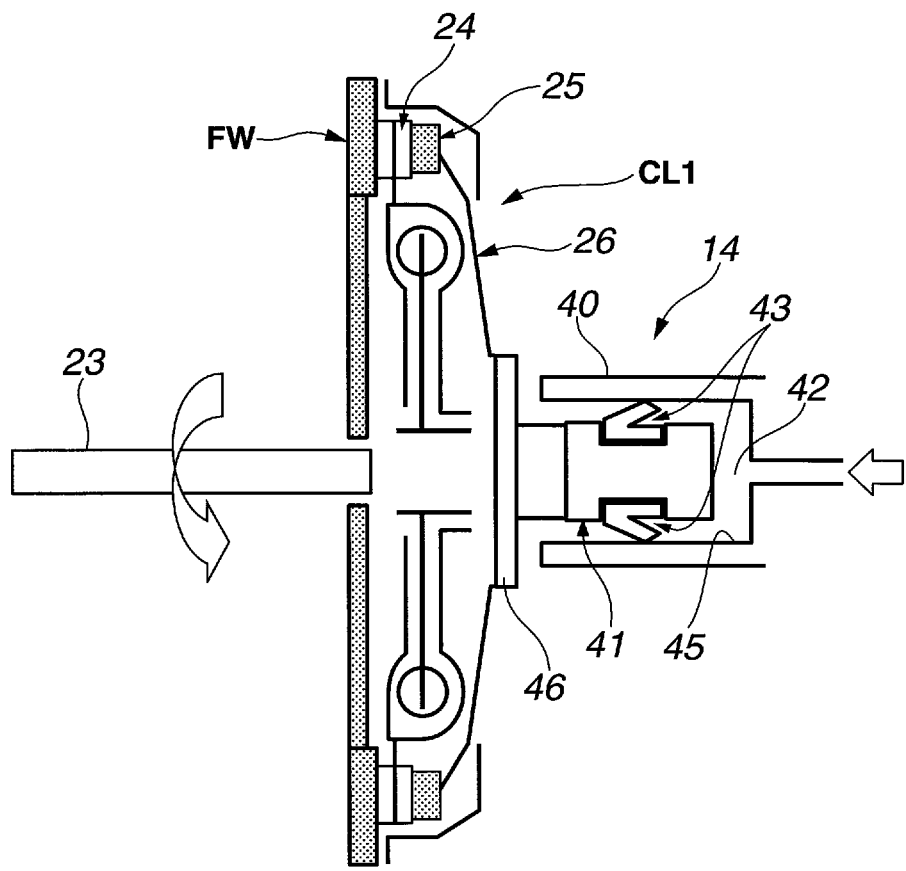
FIG. 11 is a diagram showing a clutch engagement condition by pressure holding control for the hydraulic cylinder at a high rotation speed range of the first clutch in the first embodiment.

Specifically, when first clutch CL1 is in engagement, the hydraulic pressure to retain the sealability is intentionally applied to piston chamber 42 of hydraulic cylinder 14. Owing to the application of the hydraulic pressure, as shown in FIG. 10, a tension of lip seal 43 (i.e., a pressing force of lip seal 43 against housing slide surface 45) is obtained as a resultant force of an elastic restoring force of lip seal 43 per se and the pressing force of lip seal 43 against housing slide surface 45 generated by expansion of the V-shaped opening of lip seal 43 due to introduction of the hydraulic pressure into the V-shaped opening. That is, the tension is increased as compared to the condition shown in FIG. 9 in which hydraulic pressure is not applied to the piston chamber.

Accordingly, the driving force is transmitted from engine ENG to left and right rear wheels RL, RR through first clutch CL1, which is in the engagement condition. At this time, even though a vibration component of the driving force to be transmitted is inputted to piston 41 of hydraulic cylinder 14 through diaphragm spring 26 and release bearing 46, oil leakage from lip seal 43 of hydraulic cylinder 14 can be suppressed. Further, the sealability of lip seal 43 is not enhanced per se, and therefore, for instance, upon disengagement of first clutch CL1, an increase in sliding resistance of piston 41 can be avoided to thereby ensure smooth operation of piston 41.

Thus, the clutch control apparatus according to the first embodiment is constructed such that piston 41 is sealed by lip seal 43 having an elastically deformable shape, and the tension of lip seal 43 is enhanced by applying the hydraulic pressure to piston chamber 42 even when first clutch CL1 is in the engagement condition. With this construction, even though vibration is inputted to piston 41 upon transmitting the driving force, oil leakage from lip seal 43 of hydraulic cylinder 14 can be suppressed without enhancing the sealability of lip seal 43 per se. In particular, as indicated in circled portion B shown in FIG. 8, in the high rotation speed range of engine ENG, a level of vibration is high to thereby increase the risk of oil leakage. In such a condition, oil leakage can be effectively suppressed by carrying out the pressure holding control.

In the clutch control apparatus according to the first embodiment, first clutch CL1 is pressed by piston 41, and diaphragm spring 26 of first clutch CL1 is outwardly expanded to press back piston 41 due to the centrifugal force generated upon rotation of diaphragm spring 26. By utilizing this characteristic of diaphragm spring 26, piston 41 can be retained in a position where piston 41 is prevented from being pressed forward and moved toward first clutch CL1 even when a hydraulic pressure is applied to piston 41 in order to suppress oil leakage from lip seal 43. Specifically, when piston 41 is pressed forward and moved toward first clutch CL1 by applying a hydraulic pressure in the absence of implementing the invention, the engagement force (i.e., a torque transmission capacity) of first clutch CL1 cannot be maintained to a sufficient extent. However, in a case where piston 41 is pressed back by diaphragm spring 26, the engagement force of first clutch CL1 can be maintained even when a hydraulic pressure to move piston 41 forward by an amount of the press-back stroke is applied to piston 41. Accordingly, it is possible to prevent piston 41 from being pressed forward and moved toward first clutch CL1 and to stop piston 41 in a position within a range in which the engagement force of first clutch CL1 can be maintained, while suppressing oil leakage from lip seal 43. As a result, a lack of transmission torque of first clutch CL1 can be avoided.

In the clutch control apparatus according to the first embodiment, the pressure holding control is carried out in which the hydraulic pressure is always held only in a high rotation speed range of engine ENG in which the press-back force acting on piston 41 is provided by expansion of diaphragm spring 26 due to the centrifugal force. Specifically, since a level of vibration is enhanced as a rotation speed of engine ENG becomes high, oil leakage resistance of lip seal 43 is lowered. For this reason, the pressure holding control is performed in the high rotation speed range of engine ENG in which the oil leakage resistance of lip seal 43 is lowered. As a result, oil leakage from lip seal 43 can be effectively suppressed.

In the clutch control apparatus according to the first embodiment, upon carrying out the pressure holding control, feedback control is carried out so as to stop piston 41 in an initial position where the transmission capacity of first clutch CL1 can be ensured. The feedback control uses piston stroke sensor 15 that detects a position of piston 41. Therefore, as indicated in circled portion A shown in FIG. 7, as the clutch rotation speed is increased, the press-back stroke amount of piston 41 becomes larger. In other words, as the clutch rotation speed becomes higher, the torque transmission capacity of first clutch CL1 can be more certainly ensured even through a hydraulic pressure under the pressure holding control is set to a high level. Accordingly, by applying the hydraulic pressure corresponding to the press-back stroke amount of piston 41 to piston chamber 42 under the pressure holding control, it is possible to certainly suppress oil leakage from lip seal 43 and avoid a lack of transmission torque of first clutch CL1. Further, it is possible to suppress deviation from a target pressure holding amount and a target piston position owing to variation between a hydraulic pressure command and an actual hydraulic pressure. Furthermore, piston stroke sensor 15 that detects the piston stroke position can be substituted for a hydraulic pressure detecting sensor.

The clutch control apparatus according to the first embodiment can attain the effects as described in the following.

First, a normally-closed clutch (first clutch CL1) is disposed between a driving power source (engine ENG) and left and right wheels RL, RR and is held in engagement by an elastic force applied to the clutch by an elastic member in the form of diaphragm spring 26. Hydraulic cylinder 14 serves as a hydraulic actuator of first clutch CL1 and disengages first clutch CL1 by a hydraulic force overcoming the elastic force of diaphragm spring 26. Piston 41 is slidably disposed in piston housing 40 of hydraulic cylinder 14 and has one end to which the elastic force of diaphragm spring 26 is applied and another end to which a hydraulic pressure in piston chamber 42 is applied. A seal member (here, lip seal 43) is disposed on piston 41 to enhance sealability between piston 41 and housing slide surface 45 in accordance with an increase in the hydraulic pressure in piston chamber 42. A pressure holding control section of integrated controller 10 (represented by step S6 to step S8 in FIG. 5) applies hydraulic pressure to retain the sealability of lip seal 43 to piston chamber 42 of hydraulic cylinder 14, while maintaining engagement condition of first clutch CL1. With this construction, upon transmitting the driving force, oil leakage from lip seal 43 of hydraulic cylinder 14 can be suppressed without enhancing sealability of lip seal 43 per se even when vibration is inputted to piston 41.

Second, first clutch CL1 uses diaphragm spring 26 as the elastic member which presses piston 41 toward the side of piston chamber 42 by a centrifugal force that acts on diaphragm spring 26 upon rotation of the driving power source in the engagement condition of first clutch CL1. The pressure holding control section applies a hydraulic pressure to piston chamber 42 of hydraulic cylinder 14 such that a press stroke position of piston 41 pressed by diaphragm spring 26 is in the range in which at least the engagement condition of first clutch CL1 is maintained. With this construction, in addition to the above effect, a lack of transmission torque of first clutch CL1 can be avoided, while suppressing oil leakage from lip seal 43, by utilizing the characteristic of diaphragm spring 26 that presses back piston 41.

Third, the pressure holding control section carries out pressure holding control in which hydraulic pressure is applied to piston chamber 42 of hydraulic cylinder 14 when a rotation speed of the driving power source (engine ENG) becomes not less than predetermined threshold value α. With this construction, in addition to the second effect above, oil leakage from lip seal 43 can be effectively suppressed by performing the pressure holding control in the high rotation speed range of engine ENG in which oil leakage resistance is lowered.

Fourth, a piston stroke position detecting device (in this embodiment, piston stroke sensor 15) detects a stroke position of piston 41, and upon performing the pressure holding control, the pressure holding control section determines a piston stroke position in the rotation-stop engagement condition of first clutch CL1 as target stroke position S* and carries out a feedback control so as to conform actual stroke position S to target stroke position S*. With this construction, in addition to the above second and third effects, a lack of transmission torque of first clutch CL1 can be avoided, while certainly suppressing oil leakage from lip seal 43 by applying a hydraulic pressure corresponding to an amount of the press-back stroke of piston 41 to piston chamber 42 under the pressure holding control.

Although the present invention has been described above by reference to a first embodiment, the present invention is not limited to the first embodiment. Variations or modifications will occur to those skilled in the art in light of the above teachings within the scope of the invention which is defined with reference to the claims.

For example, in the clutch control apparatus according to the first embodiment, lip seal 43 disposed on piston 41 is used as the seal member. However, another seal member such as a mechanical seal may be used as the seal member as long as the seal member used enhances the sealability between piston 41 and the housing slide surface in accordance with an increase in hydraulic pressure in the piston chamber.

In the clutch control apparatus according to the first embodiment, the pressure holding control section performs pressure holding control in the high rotation speed range of the engine not less than predetermined threshold value α when first clutch CL1 is in the engagement condition. However, the pressure holding control in another embodiment may be performed in an entire range of the rotation speed of the driving power source regardless of the rotation speed of the driving power source when first clutch CL1 is in the engagement condition.

In the clutch control apparatus according to the first embodiment, when piston 41 is pressed back by diaphragm spring 26, the pressure holding control section applies a hydraulic pressure corresponding to an amount of the press-back stroke of piston 41 to thereby increase a tension of lip seal 43 and ensure torque transmission capacity of first clutch CL1. However, in an alternative embodiment, when piston 41 is pressed back by diaphragm spring 26, the pressure holding control section may apply a hydraulic pressure to such an extent as not to press and move piston 41 forward, thereby holding piston 41 in the press-back position where piston 41 is pressed back by diaphragm spring 26 and increasing the tension of lip seal 43. That is, the pressure holding control may be performed such that piston 41 is held in any stroke position as long as the stroke position is in the piston stroke range in which the engagement condition of first clutch CL1 can be maintained. This ensures torque transmission capacity.

The clutch control apparatus according to the first embodiment is applied to a FR hybrid vehicle employing one motor and two clutches. However, embodiments of the clutch control apparatus of the present invention may also be applied to a FF hybrid vehicle employing one motor and two clutches. Further, embodiments of the present invention may also be applied to a hybrid vehicle in which second clutch CL2 and automatic transmission AT according to the first embodiment are omitted and may also be applied to an electric vehicle or an engine vehicle in which a clutch and a hydraulic cylinder are disposed between a driving power source and driving wheels.

Figure 13:
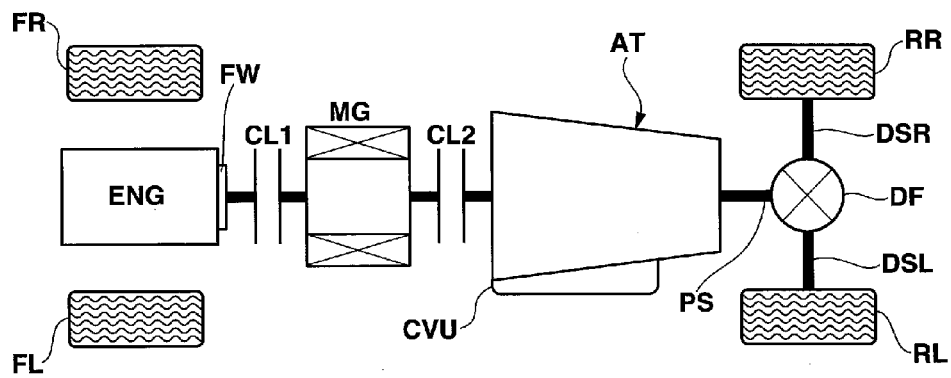
FIG. 13 is a schematic diagram showing a drivetrain of a rear-wheel-drive FR hybrid vehicle in which a second clutch is arranged between a motor/generator and a transmission.
Figure 14:
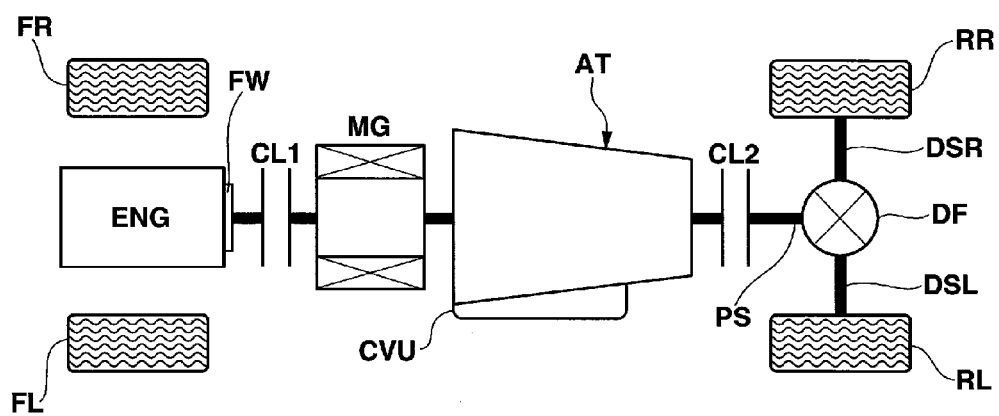
FIG. 14 is a schematic diagram showing a drivetrain of a rear-wheel-drive FR hybrid vehicle in which a second clutch is arranged between a transmission and driving wheels.

In the clutch control apparatus according to the first embodiment, one of the friction engagement elements disposed in automatic transmission AT is used as second clutch CL2 that serves as a starter clutch. However, as shown in FIG. 13, an independent second clutch CL2 may be disposed between motor/generator MG and automatic transmission AT. Further, as shown in FIG. 14, an independent second clutch CL2 may be disposed between automatic transmission AT and driving wheels RL, RR.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A clutch control apparatus for a vehicle, comprising:
a normally-closed clutch disposed between a driving power source and driving wheels, the clutch being held in engagement by an elastic force applied to the clutch by an elastic member;
a hydraulic cylinder serving as a hydraulic actuator of the clutch, the hydraulic cylinder disengaging the clutch by a hydraulic force overcoming the elastic force of the elastic member;
a piston slidably disposed in a piston housing of the hydraulic cylinder, the piston having one end to which the elastic force of the elastic member is applied and the other end to which a hydraulic pressure in a piston chamber is applied;
a seal member disposed on the piston, the seal member enhancing sealability between the piston and a housing slide surface of the piston housing in accordance with an increase in the hydraulic pressure in the piston chamber; and
a pressure holding controller, wherein upon engagement of the clutch, the pressure holding controller is programmed to:
if an engine speed rotation is equal to or greater than a threshold speed, apply additional hydraulic pressure to increase a sealing pressure between the seal member and the housing slide surface of the piston housing while maintaining an engagement condition of the clutch, wherein the threshold speed is a predetermined engine rotation speed at which vibration causes oil leakage from the piston chamber.

2. The clutch control apparatus as claimed in claim 1, wherein the elastic member is a diaphragm spring configured to press the piston by a centrifugal force that acts on the diaphragm spring upon rotation of the driving power source in the engagement condition of the clutch; and
wherein the pressure holding controller is programmed to apply the additional hydraulic pressure to the piston chamber such that a press stroke position of the piston pressed by the diaphragm spring is in a range in which the engagement condition of the clutch is maintained.

3. The clutch control apparatus as claimed in claim 2, further comprising:
a piston stroke position detecting device that detects a stroke position of the piston; and
wherein the pressure holding controller is further programmed to determine a stroke position of the piston in a rotation-stop engagement condition of the clutch as a target stroke position and carries out feedback control so as to conform an actual stroke position of the piston to the target stroke position.

4. The clutch control apparatus as claimed in claim 1, wherein the seal member is a lip seal having a V-shape in cross section positioned with an open end toward the piston chamber and a closed end toward the elastic member, a width of the opened end of the seal member expanding as the additional hydraulic pressure is applied, thereby increasing the sealing pressure between the sealing member and the housing slide surface.

* * * * *